United States Patent
Kawakami et al.

(10) Patent No.: US 7,050,626 B2
(45) Date of Patent: May 23, 2006

(54) COLOR CONVERSION APPARATUS AND COLOR CONVERSION PROGRAM STORAGE MEDIUM

(75) Inventors: Shigeki Kawakami, Kanagawa (JP); Takeshi Katayama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 599 days.

(21) Appl. No.: 09/847,442

(22) Filed: May 3, 2001

(65) Prior Publication Data

US 2001/0041001 A1 Nov. 15, 2001

(30) Foreign Application Priority Data

May 11, 2000 (JP) ............................. 2000-137986

(51) Int. Cl.
*G06K 9/00* (2006.01)
(52) U.S. Cl. ...................... 382/167; 382/164; 382/176; 382/292; 358/1.9; 358/506
(58) Field of Classification Search ........ 382/162–167, 382/181, 311, 292, 175–176, 180; 358/1.9, 358/1.15, 506, 1.8, 1.115; 345/431; 347/19, 347/15
See application file for complete search history.

(56) References Cited

U.S. PATENT DOCUMENTS

| | | | | |
|---|---|---|---|---|
| 4,642,680 A | * | 2/1987 | Yamada | 358/530 |
| 5,363,212 A | * | 11/1994 | Taniuchi et al. | 358/452 |
| 6,351,263 B1 | * | 2/2002 | Naoi | 345/589 |
| 6,574,010 B1 | * | 6/2003 | Ohnuma et al. | 358/1.9 |
| 6,646,649 B1 | * | 11/2003 | Tanabe et al. | 345/588 |
| 6,718,059 B1 | * | 4/2004 | Uchida | 382/176 |
| 2001/0019427 A1 | * | 9/2001 | Komatsu | 358/1.18 |
| 2002/0006220 A1 | * | 1/2002 | Kohchi | 382/165 |
| 2002/0012453 A1 | * | 1/2002 | Hashimoto et al. | 382/112 |
| 2004/0109605 A1 | * | 6/2004 | Uchida | 382/176 |

* cited by examiner

*Primary Examiner*—Bhavesh M. Mehta
*Assistant Examiner*—Ali Bayat
(74) *Attorney, Agent, or Firm*—Sughrue Mion, PLLC

(57) ABSTRACT

A color conversion apparatus has an input section for inputting page information having both image information including color data and character information including color data, a color conversion section for practicing mutually different color conversions for both the image information and the character information of the entered page information, and an output section for outputting page information, which has both image information after the color conversion and character information after the color conversion.

6 Claims, 6 Drawing Sheets

Fig.5

```
1  BT
2  0  0  0 r
3  12  0  0  12  50  700  Tm
4  (ABCDEFGHIJKLMNO)Tj
5  12  0  0  12  50  650  Tm
6  (PQRSTUVWXYZ)Tj
7  ET 9  400  0  0  400  20  500  cm
10 /Im1  Do 12 1  0  0 r
13 500  400  m
14 540  380  560  360  580  320  c
15 560  280  540  260  500  240  c
16 460  260  420  280  400  320  c
17 420  260  460  380  500  400  c
18 h
19 f 21 0  0  1 r
22 500  400  m
23 540  380  560  360  580  320  c
24 575  300  570  290  560  280  c
25 500  320 l
26 h
27 f
```

COLOR CONVERSION APPARATUS AND COLOR CONVERSION PROGRAM STORAGE MEDIUM

BACKGROUND OF THE INVENTION

1. Field of the Invention

The present invention relates to a color conversion apparatus for performing a color conversion of color data included in page information comprising image information and character information into different color data.

2. Description of the Related Art

Hitherto, in a plate making process in the printing industry, there is needs to perform a color conversion of color data included in page information for color printing into different color data, and thus various types of color conversion apparatuses meeting such needs are developed and widely used.

However, according to the former color conversion apparatus, character information included in the page information, image information, and screen tint information and gradation information which are a kind of the image information are subjected to a color conversion by the same color conversion table. Accordingly, this is associated with such a problem that a color of characters after the color conversion is insufficient in brightness, a tone of a natural image is unnatural, and a continuity of a color in an area of gradation information is damaged, so that a quality of an image is degraded.

Further, recently, with the development of a word processor software for a personal computer and a work station, and DTP (Desk Top Publishing) software, there is enhanced such a requirement that page information, which is produced by those sorts of software, is inputted to a printing machine using a printing ink to obtain a genuine printed matter. However, while the page information outputted from the word processor software and the DTP software is basically produced in form of RGB (Red, Green and Blue) color space data, the page information involved in the printing machine side is produced in form of CMYK (Cyan, Magenta, Yellow and Black) color space data for printing ink. Accordingly, in order that the page information consisting of RGB color space data produced by the word processor software and the DTP software can be dealt with in the printing machine, it is necessary to perform a color conversion for the page information consisting of RGB color space data into the page information consisting of CMYK color space data.

Also in the color conversion from the RGB color space data into the CMYK color space data, in a similar fashion to that of the above mentioned matter, character information included in the page information, image information, and screen tint information and gradation information are subjected to a color conversion by the same color conversion table. Thus, it often happens that colors of those types of information after the conversion are unsatisfactory.

SUMMARY OF THE INVENTION

In view of the foregoing, it is an object of the present invention to provide a color conversion apparatus capable of performing a color conversion for both the image information and the character information, which are included in the page information, into satisfactory colors.

To achieve the above-mentioned object, the present invention provides a color conversion apparatus comprising:

an input section for inputting page information having both image information including color data and character information including color data;

a color conversion section for practicing mutually different color conversions for both the image information and the character information of the entered page information; and an output section for outputting page information, which has both image information after the color conversion and character information after the color conversion.

In the color conversion apparatus according to the present invention as mentioned above, it is preferable that said color conversion section has data determination means for determining whether unit pieces of information constituting the entered page information are each concerned with image information or character information, and said color conversion section causes the image information and the character information determined by said data determination means to be stored in mutually different files, so that the image information and the character information, which are stored in mutually different files, are separately subjected to the color conversion.

Further, in the color conversion apparatus according to the present invention as mentioned above, it is also preferable that said color conversion section has data determination means for determining whether unit pieces of information constituting the entered page information are each concerned with image information or character information, and said data determination means determines the entered page information, so that the determined image information or character information are sequentially subjected to the color conversion.

Furthermore, in the color conversion apparatus according to the present invention as mentioned above, it is also preferable that when the page information entered from said input section includes screen tint information, said color conversion section performs the color conversion for the screen tint information in form of the character information. The screen tint information means information formed in such a manner that information, which has the same data structure extending over an area more than a predetermined extent in the page information, is repeated.

Still further, in the color conversion apparatus according to the present invention as mentioned above, it is also preferable that when the page information entered from said input section includes gradation information, said color conversion section performs the color conversion for the gradation information in form of the character information. The gradation information means information formed in such a manner that a pattern, which continuously varies in density of image datum of a string of datum aligned in one direction in the page information, is repeated in a direction intersecting the one direction.

Still furthermore, in the color conversion apparatus according to the present invention as mentioned above, it is also preferable that said color conversion section has a plurality of color conversion tables and color conversion table selection means for selecting any one of a plurality of color conversion tables in accordance with an operation of a user, in which a color conversion is performed in accordance with the color conversion table selected by said color conversion table selection means.

In the color conversion apparatus according to the present invention as mentioned above, it is acceptable that said input section inputs page information including three elements color space data, and said output section outputs page information including at least one color of an ink system of color data. And it is also acceptable that wherein said input section inputs page information including RGB color space data, and said output section outputs page information including CMYK color space data.

Further, in the color conversion apparatus according to the present invention as mentioned above, it is acceptable that said output section outputs, page information in form of page information described in layout description information or in form of page information subjected to a raster development.

To achieve the above-mentioned object, the present invention provides a color conversion program storage medium storing a color conversion program for forming on a computer network a color conversion apparatus comprising:

an input section for inputting page information having both image information including color data and character information including color data;

a color conversion section for practicing mutually different color conversions for both the image information and the character information of the entered page information; and an output section for outputting page information, which has both image information after the color conversion and character information after the color conversion.

Incidentally, while the "page information" referred to in the present invention means information included in one page, the "one page" includes ones in which a plurality of pages is assembled or paged up to be reconstructed into one page.

BRIEF DESCRIPTION OF THE DRAWINGS

FIG. 5 is a view showing a layout descriptive sentence in which the page information shown in FIG. 4 is described by PDF.

DETAILED DESCRIPTION OF PREFERRED EMBODIMENTS

Embodiments of the present invention will be described with reference to the accompanying drawings.

Figure 1:
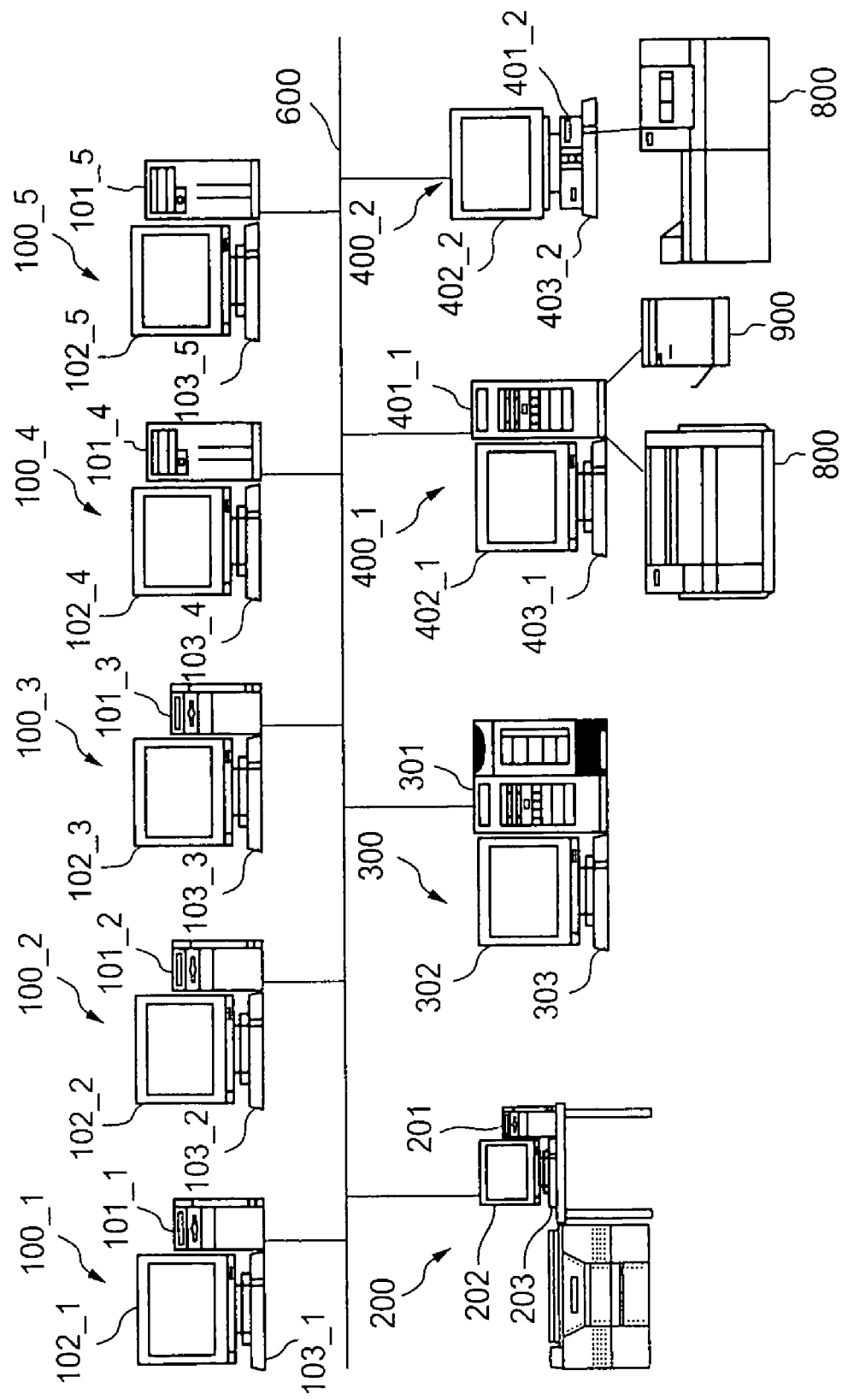
FIG. 1 is a view of a part of a computer system in which an embodiment of a color conversion apparatus according to the present invention is applied.

FIG. 1 is a view of a part of a computer system in which an embodiment of a color conversion apparatus according to the present invention is applied, FIG. 1 shows a client-and-server type of computer system comprising five client machines 100_1, 100_2, 100_3, 100_4 and 100_5, a scanner 200, a DTP (Desk Top Publishing) server 300, and two RIPs (raster image processors) 400_1 and 400_2.

Each of the client machines 100_1, 10_2, 100_3, 100_4 and 100_5, the scanner 200, the DTP server 300, and the RIPs (raster image processors) 400_1 and 400_2 is constituted of a relative small type of workstation or personal computer. Those client machines, scanner, DTP server and RIPs are connected to each other via a LAN (Local Area Network) 600.

The scanner 200 reads an image formed on a sheet and sends image data read via the LAN 600 to each of the client machines.

Each of the client machines creates page information in accordance with the image data sent from the scanner 200, or creates page information described with a PS (Post Script) by a DTP software such as "Ilustrator®". Those types of page information are sent via the LAN 600 to the DTP server 300.

The DTP server 300 is constituted of a relatively large type of workstation. The DTP server 300 receives page information described with the PS language, or PDF (Portable Document Format), which are created by each of the client machines or another machine, performs a color conversion by a color conversion apparatus formed inside the DTP server 300, and transmits page information after the color conversion via the LAN 600 to each of the RIPs.

Each of the RIPs performs a raster development for the page information transmitted from the DTP server 300, and outputs a machine plate for printing from a plate setter 800 provided on each of the RIPs or outputs a film for producing a machine plate from a printer 900.

The client machines, the scanner, the DTP server and the RIPs are provided with: main frames 101_1, 101_2, 101_3, 101_4 and 101_5, 201, 301, 401_1 and 401_2 each incorporating therein a CPU (Central Processing Unit), a RAM (Random Access Memory), a hard disk, a communicating board, etc.; display units 102_1, 102_2, 102_3, 102_4 and 102_5, 202, 302, 402_1 and 402_2 each displaying image information and character information on a screen in a accordance with an instruction from the associated main frame; and keyboards 103_1, 103_2, 103_3, 103_4 and 103_5, 203, 303, 403_1 and 403_2 each inputting an instruction of a user to the associated main frame, respectively.

The main frame body of each of the client machines, the scanner, the DTP server and the RIPs is provided with an FD (floppy disk) drive onto which an FD is loaded and a CD-ROM drive onto which a CD-ROM is loaded. Each of the client machines, the scanner, the DTP server and the RIPs also incorporates therein a floppy disk driver for driving the FD loaded onto the FD drive and a CD-ROM driver for driving the CD-ROM loaded onto the CD-ROM drive, respectively.

In the hard disk of the DTP server 300, there is formed a color conversion apparatus according to the present embodiment which will be described later.

Figure 2:
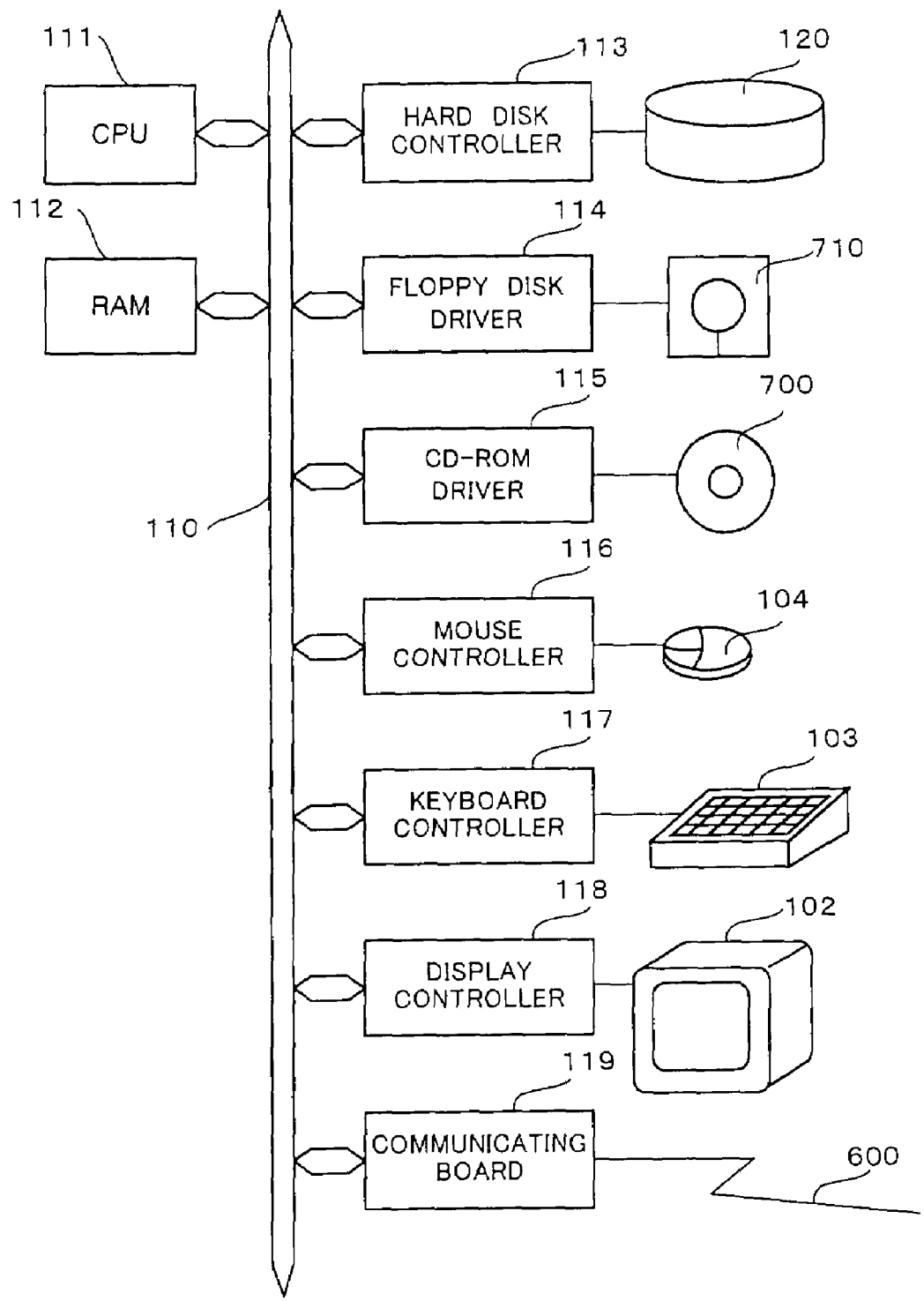
FIG. 2 is a hardware construction view of the color conversion apparatus (computer system) having an external appearance shown in FIG. 1.

FIG. 2 is a hardware construction view of the color conversion apparatus (computer system) having an external appearance shown in FIG. 1.

The hardware construction view of FIG. 2 shows a CPU 111, a RAM 112, a hard disk controller 113, a floppy disk driver 114, a CD-ROM driver 115, a mouse controller 116, a keyboard controller 117, a display controller 118, and a communicating board 119. Those are connected to each other through a bus 110.

Floppy disk 710 and CD-ROM 700 are loaded onto the floppy disk driver 114 and the CD-ROM driver 115, respectively. The floppy disk driver 114 and the CD-ROM driver 115 drive the loaded floppy disk 710 and CD-ROM 700, respectively.

The communicating board 119 is connected to the LAN 600.

FIG. 2 further shows a hard disk 120 accessed by the hard disk controller 113, a mouse 104 controlled by the mouse controller 116, a keyboard 103 controlled by the keyboard controller 117, and a CRT display 102 controlled by the display controller 118.

A color conversion apparatus of the present invention is formed on the computer system as mentioned above to perform a color conversion processing for page information.

Figure 3:
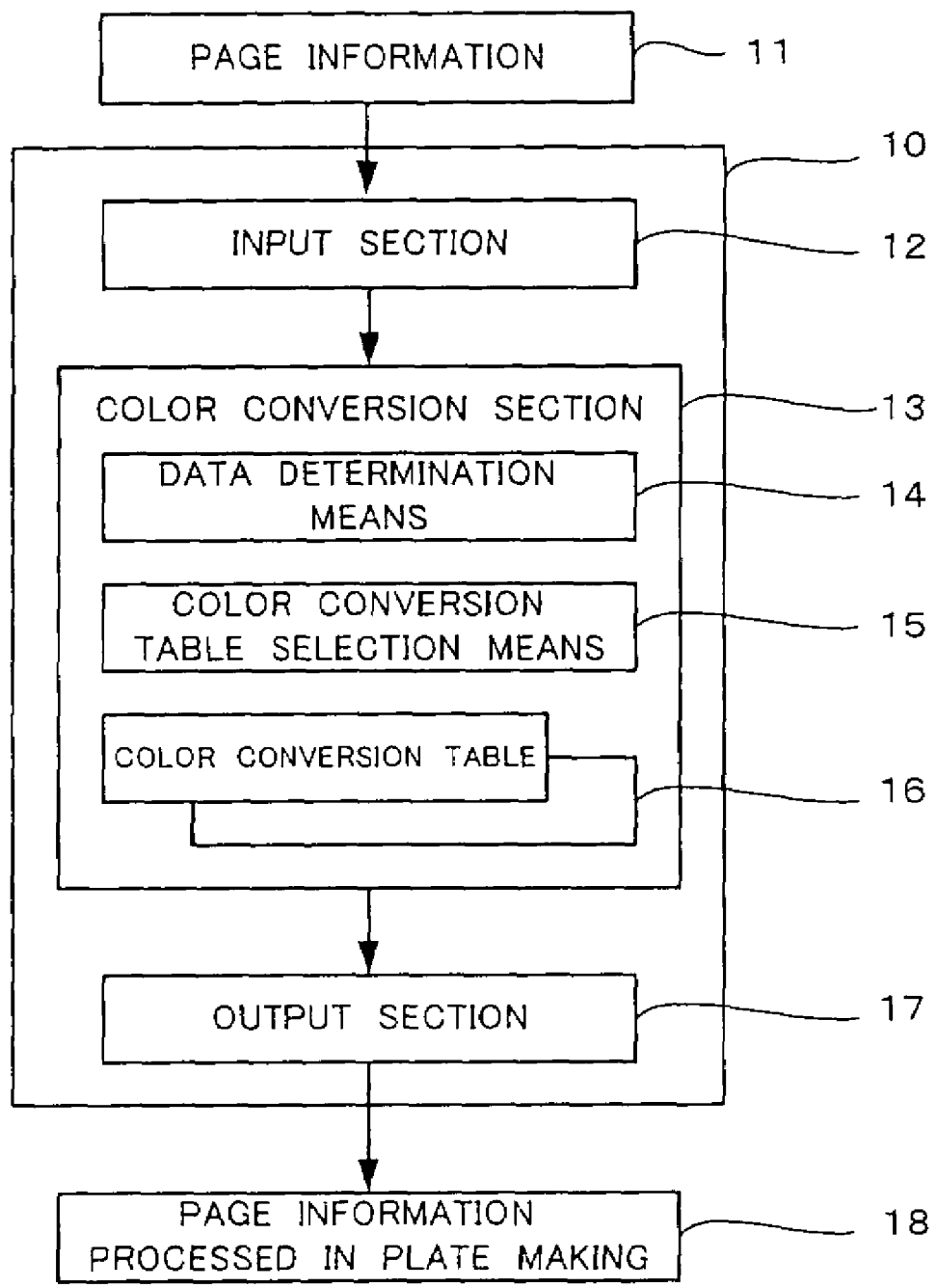
FIG. 3 is a schematic construction view of an embodiment of a color conversion apparatus according to the present invention.

FIG. 3 is a schematic construction view of an embodiment of a color conversion apparatus according to the present invention.

As shown in FIG. 3, a color conversion apparatus 10 comprises an input section 12 for inputting page information 11 having both image information including color data and character information including color data, a color conversion section 13 for practicing mutually different color conversion for both the image information and the character information of the entered page information, and an output section 17 for outputting page information 18 processed in plate making, which has both image information after the color conversion and character information after the color conversion.

According to the present embodiment, the color conversion section 13 is provided with data determination means 14 for determining whether unit pieces of information constituting the entered page information 11 are each concerned with image information or character information. The data determination means 14 determines the entered page information 11, so that the determined image information or character information are sequentially subjected to the color conversion and then transmitted to the output section 17.

The color conversion section 13 is further provided with a plurality of color conversion tables 16 and color conversion table selection means 15 for selecting any one of a plurality of color conversion tables 16 in accordance with an operation of a user. The color conversion is performed in accordance with the color conversion table selected by the color conversion table selection means 15. With respect to the color conversion tables, it is acceptable to use the color conversion tables 16, which are prepared in the color conversion section 13 beforehand, as mentioned above. It is also acceptable, however, that a user creates color conversion tables and stores the same in the color conversion section 13, so that the stored color conversion tables are selectively used.

It is also acceptable that the output section 17 is so arranged that page information is outputted in form of page information described in layout description information or in form of page information subjected to a raster development. Such an arrangement makes it possible to enhance an efficiency of the plate making process in its entirety.

Next, there will be described a color conversion processing for page information by the color conversion apparatus 10.

First step: a user selects beforehand a color conversion table for character information and a color conversion table for image information, which are suitable for page information to be subjected to the color conversion.

Second step: a user inputs to the color conversion apparatus 10 (cf. FIG. 3) PS page information 11 or PDF page information 11 (including RGB).

Third step: the data determination means 14 of the color conversion apparatus 10 analyzes the internal structure of the entered PS page information or PDF page information and determines whether unit pieces of information constituting the entered page information are each concerned with image information or character information, and extracts an image information portion so that the image information portion is stored in an image information file, while a portion other than the image information portion is stored in a character information file.

Fourth step: the image information file is subjected to a color conversion processing by an image color conversion module (not illustrated) formed on the color conversion section 13, and the character information file is subjected to a color conversion processing by a character color conversion module (not illustrated) formed on the color conversion section 13.

Fifth step: the image information file and the character information file after the color conversion processing are merged in a single PDF file, and then outputted from the output section 17.

According to the present embodiment, as mentioned above, the color conversion section 13 is so arranged that the image information and the character information, which are determined by the data determination means 14, are stored in mutually different files, respectively, and the image information and the character information, which are stored in the associated files, respectively, are subjected to a color conversion by different color conversion modules. However, the present invention is not restricted to this arrangement. That is, there is no need that the image information and the character information thus determined are stored in different files and are subjected to the color conversion by the different color conversion modules. For example, it is acceptable that the color conversion section 13 is arranged in such a manner that the entered page information is determined by the data determination means 14, while the image information or the character information thus determined is sequentially subjected to the color conversion. However, an adoption of the scheme according to the present embodiment as mentioned above, in which the image information and the character information are stored in different files and then the color conversion is carried out, makes it possible, for example, that a color conversion processing for the file storing the image information and a color conversion processing for the file storing the character information are carried out by different DTP servers, respectively. This feature makes it possible to greatly enhance a processing efficiency.

Incidentally, in the third step, in the event that the page information entered from the input section includes screen tint information, the color conversion section of the present embodiment is so arranged that the screen tint information is subjected to the color conversion in form of the character information. This arrangement makes it possible to prevent a color of a portion of the screen tint information from becoming dim in the event that the screen tint information is subjected to the color conversion by the color conversion table which is the same as the image information.

Likewise, in the third step, in the event that the page information entered from the input section includes gradation information, the color conversion section of the present embodiment is so arranged that the gradation information is subjected to the color conversion in form of the character information. This arrangement makes it possible to convert the gradation information into a color having continuity suitable for the gradation information.

Figure 4:
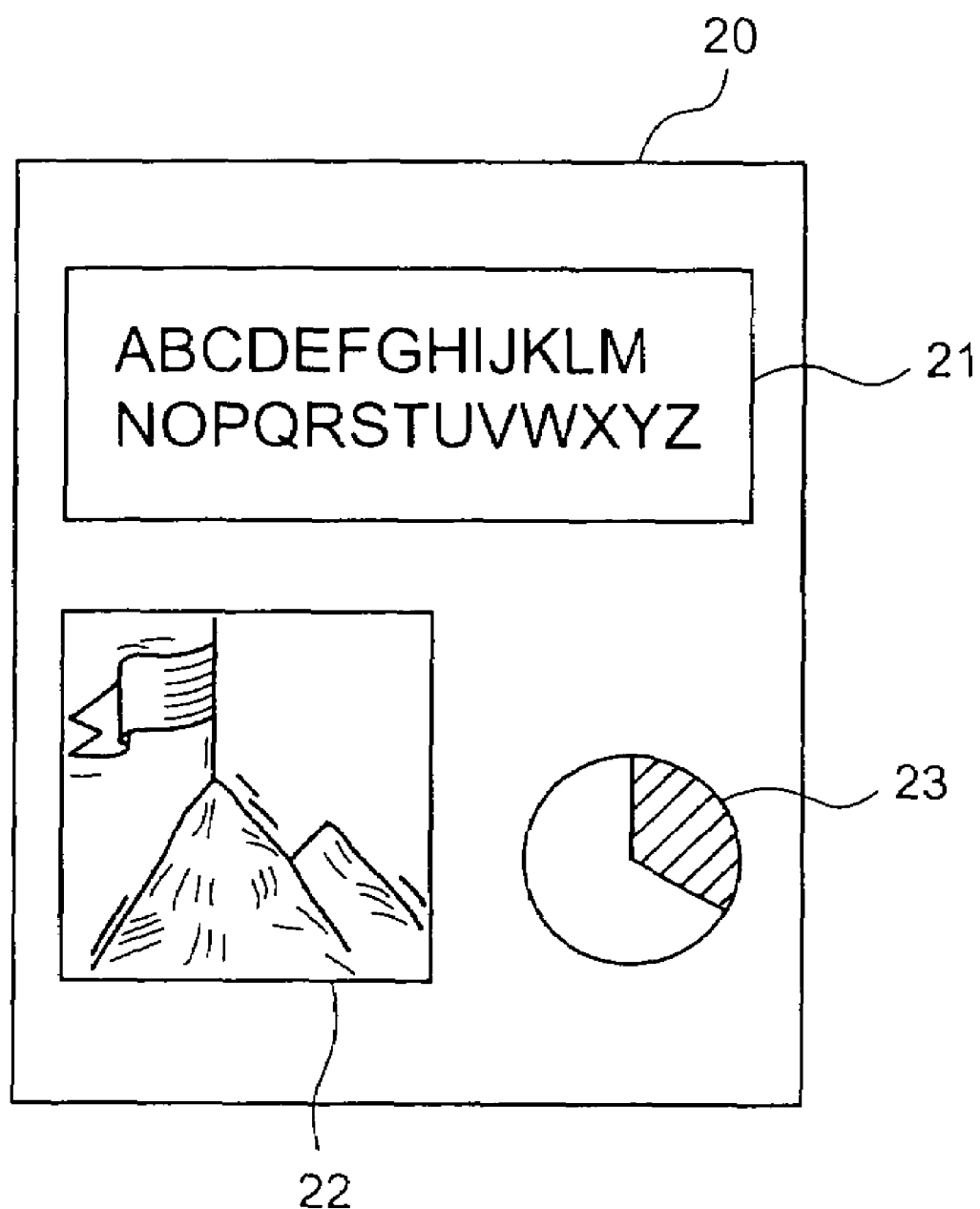
FIG. 4 is a view showing an example of page information to be processed by a color conversion apparatus according to the embodiment of the present invention.

FIG. 4 is a view showing an example of page information to be processed by a color conversion apparatus according to the embodiment of the present invention.

As shown in FIG. 4, page information 20 includes a character information area 21 in which character information from "A" to "Z" is described, an image information area 22 in which image information representative of a picture of a mountain is drawn, and a line art information area 23 representative of a circle graph.

FIG. 5 is a view showing a layout descriptive sentence in which the page information shown in FIG. 4 is described by PDF.

As shown in FIG. 5, on first to seventh lines, there is described the character information area 21 of FIG. 4.

That is, "BT" appearing at the first line denotes a start of plotting for the character information area, and the "BE" appearing at the seventh line denotes a termination of plotting for the character information area.

Of "0 0 0 r" appearing at the second line, "r" denotes that it is involved in the RGB space, and "0 0 0" denotes that it is involved in black. Incidentally, in the event that instead of "r", "k" is described, it denotes that it is involved in the CMYK space.

Third and fifth lines are to designate plotting positions.

A section between brackets "("and ")" appearing at fifth and sixth lines indicate character sequence, and "T j" appearing at the end of fourth and six-h lines indicates an order of plotting a string of characters.

Next, on ninth line et seqq., there is described the image information area 22 of FIG. 4. That is, the ninth line designates plotting positions, and the tenth line describes an order of plotting of image data to which a tag "Im1" is applied. The image data involved in the tag "Im1" is stored in a predetermined data storage area (not illustrated) in form of image data of raster formality together with information of the number of pixels and color space.

Next, on $12^{th}$ to $27^{th}$ lines, there is described the line art information area 23. Of those lines $12^{th}$ to $19^{th}$ lines are concerned with a description relating to the plotting of the line art information of a circle of the line art information area 23 of FIG. 4, and the $21^{st}$ to $27^{th}$ lines are concerned with a description relating to the plotting of the line art information of an arc of the line art information area 23 of FIG. 4.

That is, "1 0 0 r" appearing at $12^{th}$ line denotes red. $13^{th}$ to $17^{th}$ lines indicate where and what circle is drawn. "h" appearing at $18^{th}$ line indicates an order of closing the line, that is, closing figure. "f" appearing at $19^{th}$ line indicates an order of blotting the inside of the figure of the circle "0 0 1 r" appearing at $21^{st}$ line denotes blue. $22^{nd}$ to $25^{th}$ lines indicate where and what circle is drawn. "h" appearing at $26^{th}$ line indicates an order of closing the line, that is, closing figure. "f" appearing at $27^{th}$ indicates an order of blotting the inside of the figure of the circle.

In this manner, according to the present embodiment, the plotting order is described individually for each of the character information area, the line art information area and the image information area. Thus, the data determination means 14 (cf. FIG. 3) of the present embodiment can readily determine which one pieces of unit information, which constitute the page information, is associated with among the image information, the line art information and the character information.

Next, there will be described the color conversion. First, with respect to the black, according to the example shown in FIG. 5, the plotting color of the character information area 21 of FIG. 4 is represented by "0 0 0 r". This shows that each color of RGB is plotted in 0% in the RGB color space, in other words, it is plotted with black.

In the event that the color conversion apparatus 10 is constructed assuming that the input section 12 (cf. FIG. 3) in the color conversion apparatus of the present embodiment is used for inputting page information including RGB color space data, and the output section 17 (cf. FIG. 3) is used for outputting page information including CMYK color space data, the description represented by "0 0 0 r" is converted into the description represented by "0 0 0 1 k". This indicates that the conversion is made in the CMYK color space in CMY: 0% and K: 100%. Incidentally, in RGB, the smaller number is associated with deeper color. In CMYK, the larger number is associated with deeper color.

In CMYK, it is possible logically that a black is expressed by "1 1 1 0 k". However, this brings about a loose black owing to a delicate color deviation at the time of actual printing and it is not useful. Accordingly, it often happens that "0 0 0 1 k" is used.

On the other hand, in case of the image information, even if there is by chance a pixel represented by "0 0 0 r", there is a high possibility that: the just adjacent pixel is associated with a color in which any one color comes out a little. Accordingly, in the event that only the pixel of "0 0 0 r" is replaced by "1 1 1 0 k", there is no continuity with respect to the surroundings, and thus there is a possibility that it is unnatural image. Therefore, although it is necessary to keep a balance between it and the color of the surroundings, there is a need to perform a conversion maintaining a halftone such as "0. 5 0. 5 0. 5 0. 5 k".

Next, there will be explained a color conversion processing for a blue.

According to the example shown in FIG. 5, the plotting color of the line art information area 23 of FIG. 4 is represented by "0 0 1 r". This "blue" is a "blue" displayed on the monitor created by the DTP software and is a rather bright blue. Further, this "blue" is also a memory color, and thus the brightness is an important element. However, in the event that this "0 0 1 r" is simply converted into CMYK, it becomes "1 1 0 0 k", and thus if it is printed in form of "1 1 0 0 k", it will be a sober blue rather tinged with red. This may give a looking person a greatly different impression from the "blue" initially displayed on the monitor.

In order to prevent an occurrence of a difference in color due to the CMYK conversion, there is a need that colors such as "0 0 1 r" for the text information and the line art information are converted into colors, of CMYK enhanced in brightness, for example, "1 0. 7 0. 2 0 k". However, in the event that such a color conversion is applied to the natural image, the brightness is enhanced to bring about the unnatural color, so that a natural property of an image is lost. That is, it is necessary for the page information having both the image information and the character information that the color conversion is performed in accordance with the associated color conversion table suitable for the respective information.

According to the example of the color conversion processing as mentioned above, there is explained an example in which the color conversion apparatus 10 of the present embodiment converts page information including RGB color space data into page information including CMYK color space data. However, the color conversion apparatus of the present invention is not always restricted to this example, and for example, it is acceptable that page information including three elements color space data is converted into page information including at least one color of an ink system of color data.

Next, there will be described a color conversion program storage medium according to the present embodiment.

Figure 6:
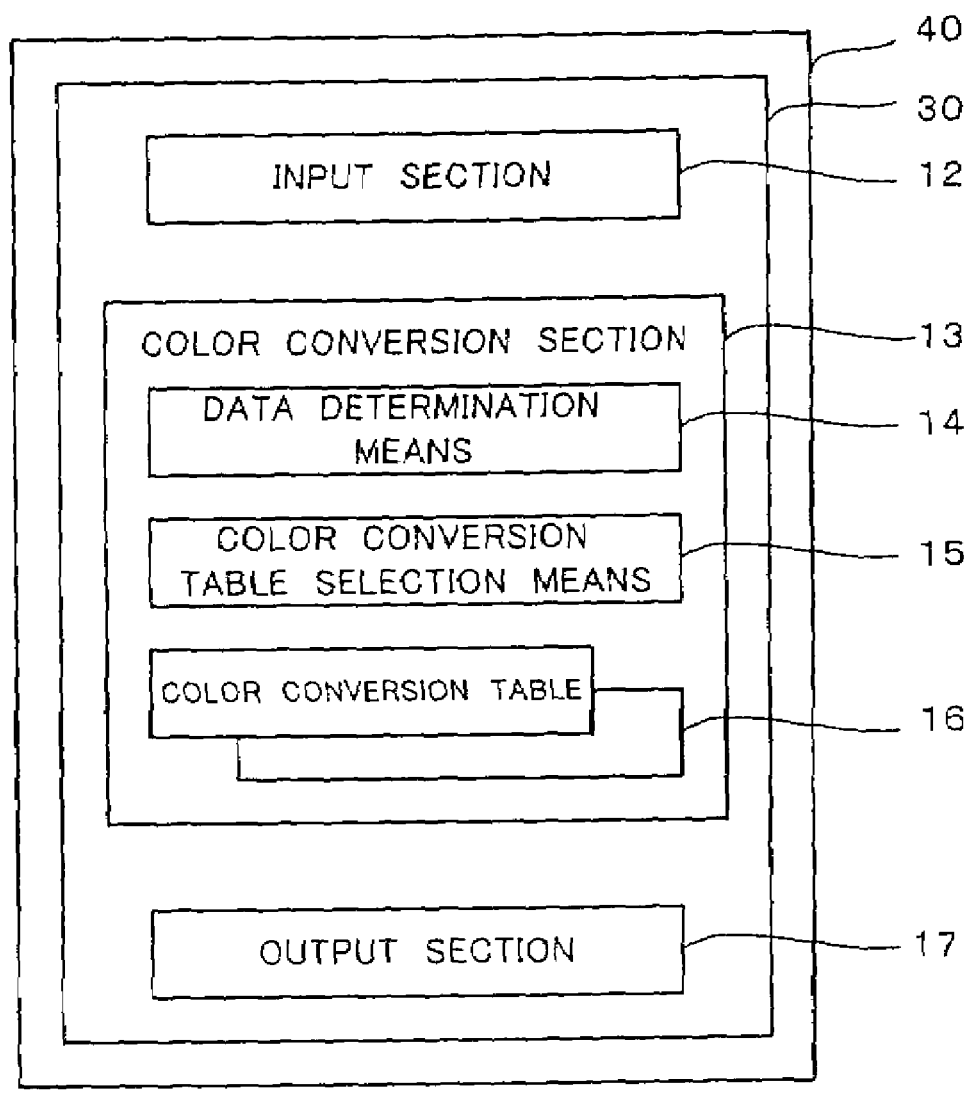
FIG. 6 is a schematic construction view of a color conversion program storage medium according to an embodiment of the present invention.

FIG. 6 is a schematic construction view of a color conversion program storage medium according to an embodiment of the present invention.

As shown in FIG. 6, a color conversion program storage medium 40 according to the present embodiment stores a color conversion program 30 which is provided with an input section 12 for inputting page information 11 having both image information including color data and character information including color data, a color conversion section 13 for practicing mutually different color conversion for both the image information and the character information of the entered page information, and an output section 17 for outputting page information 18 having both image information after the color conversion and character information after the color conversion. In this case, the input section 12, the color conversion section 13 and the output section 17 are representative of a software portion formed on the memory unit of the computer, and are different from a combination of the hardware portion and the software portion of the color conversion apparatus in which the input section 12, the color conversion section 13 and the output section 17 in the color conversion apparatus shown in FIG. 3 are formed on the computer system.

Incidentally, a type of storage medium of the color conversion program storage medium 40 is not particularly restricted. Any one is acceptable, as the storage medium, which can store the color conversion program 30. It is possible to use a desired storage medium, for example, a CD-ROM, a CD-R/RW, an MO (magneto-optical disk), and a floppy disk.

The color conversion program 30 stored in the color conversion program storage medium 40 is loaded onto the CD-ROM drives of the client machines 100_1, 100_2, 100_3, 100_4 and 100_5 (cf. FIG. 1) so that the color conversion program 30 is read into those client machines and is installed in the storage units of the client machines. Thus it is possible to readily provide the color conversion apparatus of the present invention.

As mentioned above, according to a color conversion apparatus of the present invention, there is provided such an arrangement that page information having both image information and character information is inputted, mutually different color conversions are practiced for both the image information and the character information of the entered page information, and page information having both image information after the color conversion and character information after the color conversion is outputted. This arrangement makes it possible to implement a color conversion apparatus capable of performing a color conversion for both the image information and the character information included in the page information into satisfied colors.

Further, according to a color conversion program storage medium of the present invention, it is possible to readily form the above-mentioned color conversion apparatus on the computer system.

Although the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion apparatus comprising:
  an input section for inputting page information having both image information including color data and character information including color data;
  a color conversion section for practicing mutually different color conversions for both the image information and the character information of the entered page information; and
  an output section for outputting page information, which has both image information after the color conversion and character information after the color conversion,
  wherein said color conversion section has data determination means for determining whether unit pieces of information constituting the entered page information are each concerned with image information or character information, and said color conversion section causes the image information and the character information determined by said data determination means to be stored in mutually different files, so that the image information and the character information, which are stored in mutually different files, are separately subjected to the color conversion.

2. The apparatus of claim 1, wherein the determination means determines image information and character information automatically.

3. A color conversion apparatus comprising:
  an input section for inputting page information having both image information including color data and character information including color data;
  a color conversion section for practicing mutually different color conversions for both the image information and the character information of the entered page information; and
  an output section for outputting page information, which has both image information after the color conversion and character information after the color conversion,
  wherein said color conversion section has data determination means for determining whether unit pieces of information constituting the entered page information are each concerned with image information or character information, and said data determination means determines the entered page information, so that the determined image information or character information are sequentially subjected to the color conversion.

4. A color conversion apparatus comprising:
  an input section for inputting page information having both image information including color data and character information including color data;
  a color conversion section for practicing mutually different color conversions for both the image information and the character information of the entered page information; and
  an output section for outputting page information, which has both image information after the color conversion and character information after the color conversion,
  wherein said color conversion section has a plurality of color conversion tables and color conversion table selection means for selecting any one of a plurality of color conversion tables in accordance with an operation of a user, in which a color conversion is performed in accordance with the color conversion table selected by said color conversion table selection means.

5. A color conversion apparatus comprising:
  an input section for inputting page information having both image information including color data and character information including color data;
  a color conversion section for practicing mutually different color conversions for both the image information and the character information of the entered page information; and
  an output section for outputting page information, which has both image information after the color conversion and character information after the color conversion,
  wherein the color conversion section converts the image information using a first color conversion from a first device dependent space to a second device dependent space, and further converts the character information from the first device dependent space to the second device dependent space using a second color conversion mutually different than the first conversion between the first and second device dependent color spaces.

6. The apparatus of claim 5, wherein the first and second conversions between the first and second device dependent color spaces follow one after another sequentially.

* * * * *